(No Model.)   2 Sheets—Sheet 1.

W. T. BENNETT.
DITCHING MACHINE.

No. 294,567.   Patented Mar. 4, 1884.

(No Model.) 2 Sheets—Sheet 2.

W. T. BENNETT.
DITCHING MACHINE.

No. 294,567. Patented Mar. 4, 1884.

Witnesses:
Wm. A. Rosenbaum
H. A. Daniels

Inventor:
William T. Bennett
By W. Burris
Attorney.

UNITED STATES PATENT OFFICE.

WILLIAM T. BENNETT, OF NEWPORT, INDIANA.

DITCHING-MACHINE.

SPECIFICATION forming part of Letters Patent No. 294,567, dated March 4, 1884.

Application filed July 21, 1883. (No model.)

*To all whom it may concern:*

Be it known that I, WILLIAM T. BENNETT, a citizen of the United States of America, residing at Newport, in the county of Vermillion and State of Indiana, have invented certain new and useful Improvements in Ditching-Machines, of which the following is a specification, reference being had therein to the accompanying drawings.

This invention relates to that class of ditching-machines having devices for cutting and excavating, and also for removing the excavated earth; and it consists in certain improvements in the construction of such machines, as hereinafter described and claimed.

Figure 1:
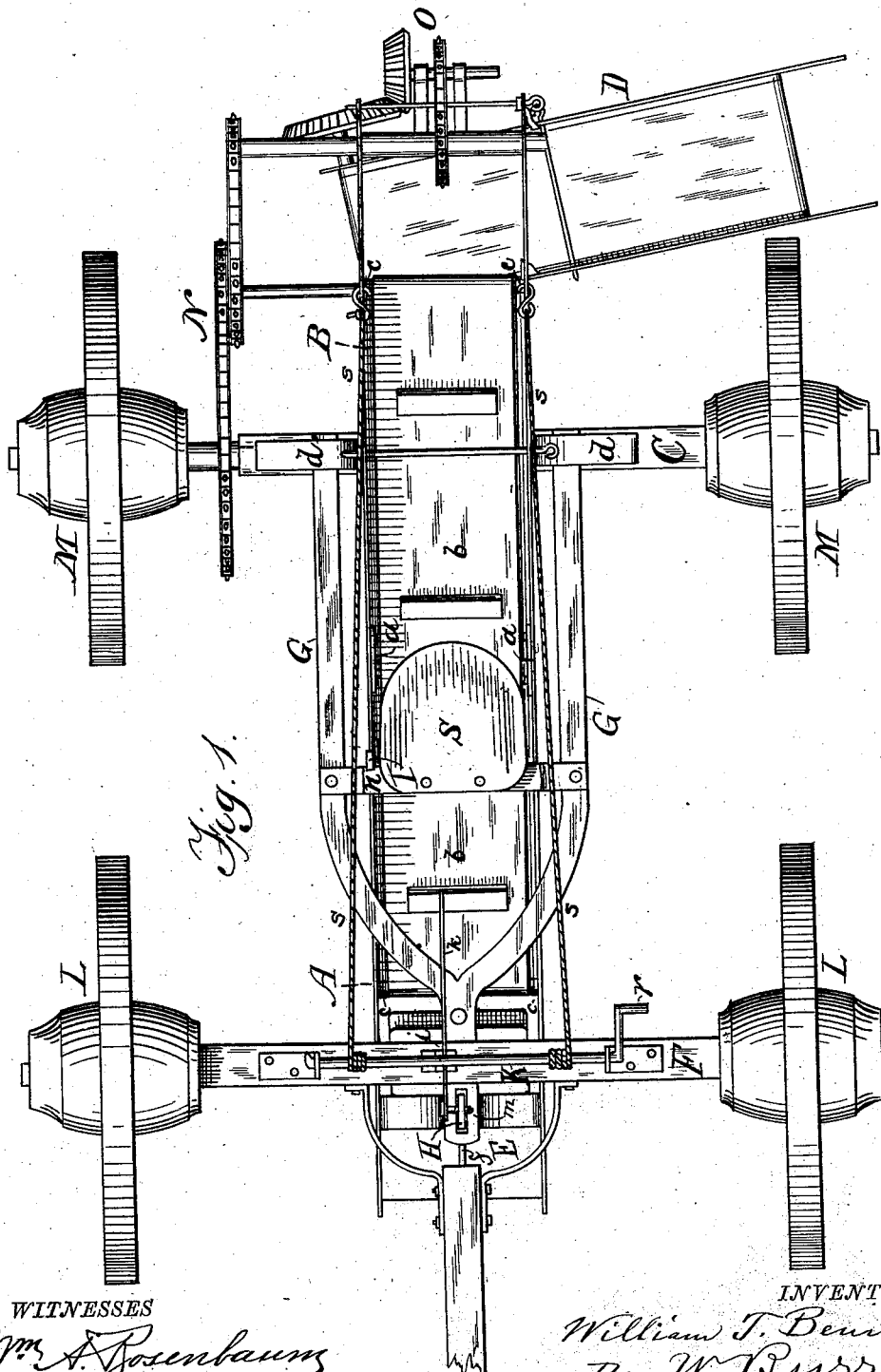
Figure 2:
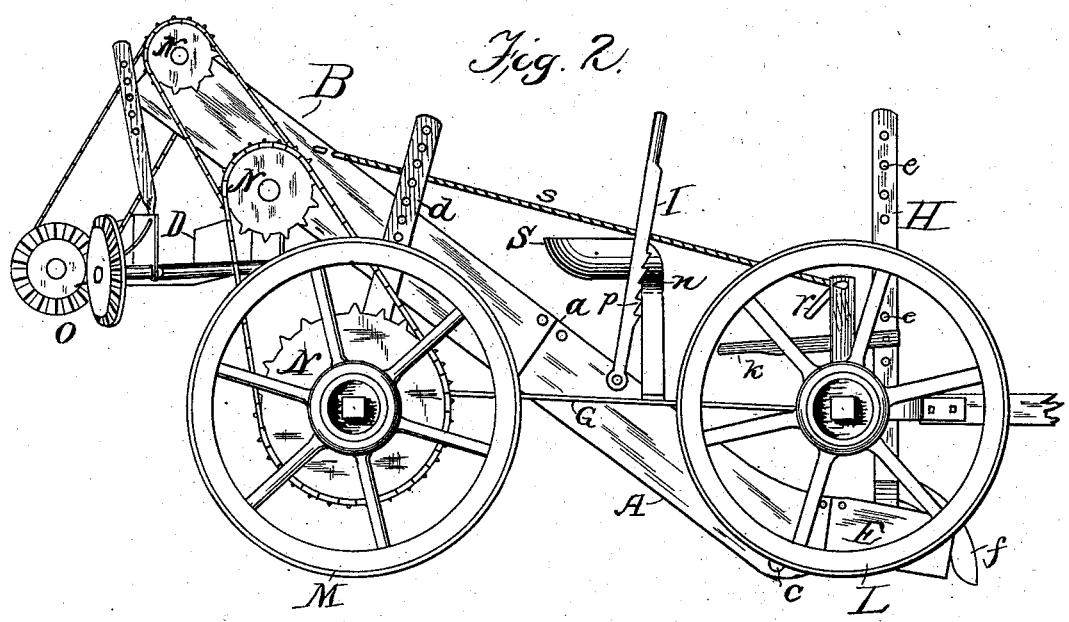
Figure 3:
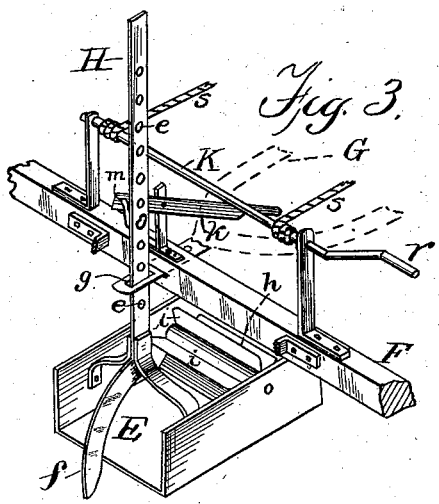

In the accompanying drawings, Figure 1 is a plan view of a ditching-machine having my improvements. Fig. 2 is a side elevation of the same. Fig. 3 is a perspective view, illustrating the scoop, the standard, and cutter and connecting parts.

The frame of the elevator forming the conveyer for excavated earth is made in two sections, A and B. These sections are hinged together, as seen at $a$, to allow the adjustment of either in elevation, as desired. An endless belt or carrier, $b$, for conveying the earth, passes over the rollers $c$, one being placed at each end of the elevator, as shown. The section B of the elevator-frame is mounted on the rear axle, C, being adjustably secured to the standards $d$, stepped upon the axle. To the upper and rear end of the elevator is secured a transverse carrier, D, suitably adjusted to receive the earth from the elevator and convey it away from the line of the ditch. To the front end of the elevator is secured the scoop or excavating-shovel E, extending forward under the front axle, F.

G is a bifurcated coupling connecting the front and rear axles. The forward end of the coupling extends through and a few inches in front of the front axle, to which it is secured by a bolt.

H represents a standard having numerous holes to receive the lifting-hook hereinafter described, adjusted to slide vertically in a slot in the end of the coupling G in front of the forward axle. This standard is attached to the sides of the scoop, and upon its lower end is formed a vertical cutter, $f$, extended downward in front of and a little below the cutting portion of the scoop. The slot G in the end of the coupling is large enough to allow of the irregular movement of the front axle, and thus avoids binding of the standard. The standard H has a number of holes, $e$, to receive a pin by means of which the scoop may be adjusted in position vertically, as required, to adapt it to the depth of the cut.

Within the scoop E is placed a rotating cutter, $h$, having blades $i$, for the purpose of cutting sods and clods of earth passing into the scoop, and thus prevent the clogging of the carrier $b$. When the soil is too wet and soft, the cutter $h$ is usually removed from the shovel after the sod (if any) upon the surface has been removed.

A lever, $k$, is pivoted to an upright fixed to the front axle, F. This lever is provided with a hook, $m$, in position to enter a hole in the standard H of the cutter $f$. By means of lever $k$ the driver may at any time raise the scoop E and the forward end of the elevator, as desired.

The draft-power of the machine-carriage may be applied to the standard H of the cutter, a clevis being secured thereto by pins passing through holes in the standard.

The driver's seat S is mounted on a cross-bar, $n$, having standards fixed to the bifurcated coupling G, as shown. Near the driver's seat and pivoted at its lower end to the elevator is a hand-bar, I, provided with teeth $p$ along its edge, which may be closed against the bar $n$, the teeth engaging therewith, and by this means the two sections of the elevator, after being adjusted as to elevation, may be secured in position.

K designates a windlass carried by the front axle, F, and provided with a crank, $r$, and the cords or chains $s$, extending backward and connected with the rear section of the elevator, by means of which the rear section of the elevator may be raised to any desired angle or inclination.

The front wheels, L, of the machine-carriage serve as guide-wheels, and the rear wheels, M, are driving-wheels, motion being imparted therefrom through suitable gearing, N, to the main carrier $b$ in the elevator, and through gearing O to the carrier D.

The driving mechanism is provided with ratchet and pawl, or other suitable devices, (not shown,) as heretofore used, for the purpose of putting the mechanism in or out of gear.

The front and rear sections of the elevator being hinged together at a point about midway between the scoop E and carrier D, renders it unnecessary to raise the rear section, B, until the ditch has been cut several feet in depth.

When the driver desires to raise the scoop and front end of the elevator, he pulls the toothed bar I from the bar $n$, leaving the two sections of the elevator to move on the hinge $a$, and then raises the scoop by means of lever $k$, connecting with standard H.

A pulley (not shown) is attached under the rear end of the tongue to receive a draft-chain.

Having described my invention, I claim—

1. In a ditching-machine, the excavating-scoop E, secured to the elevator-frame and provided with a perforated standard, H, arranged to slide vertically in the slotted end of the coupling G, and having its lower end constructed to form a vertical cutter, $f$, extended downward in front of and below the cutting portion of the scoop, substantially as and for the purposes described.

2. The combination, with the elevator in two sections hinged together, as shown, of a toothed hand-bar pivoted to the forward section, a cross-bar, $n$, supported by the machine-carriage, and a windlass carried by the front axle and connected by cords or chains with the rear section of the elevator, substantially as shown and described.

In testimony whereof I have affixed my signature in presence of two witnesses.

WILLIAM T. BENNETT.

Witnesses:
JOHN RICHARDSON,
WILLIAM PEMLEY.